Figure 1:
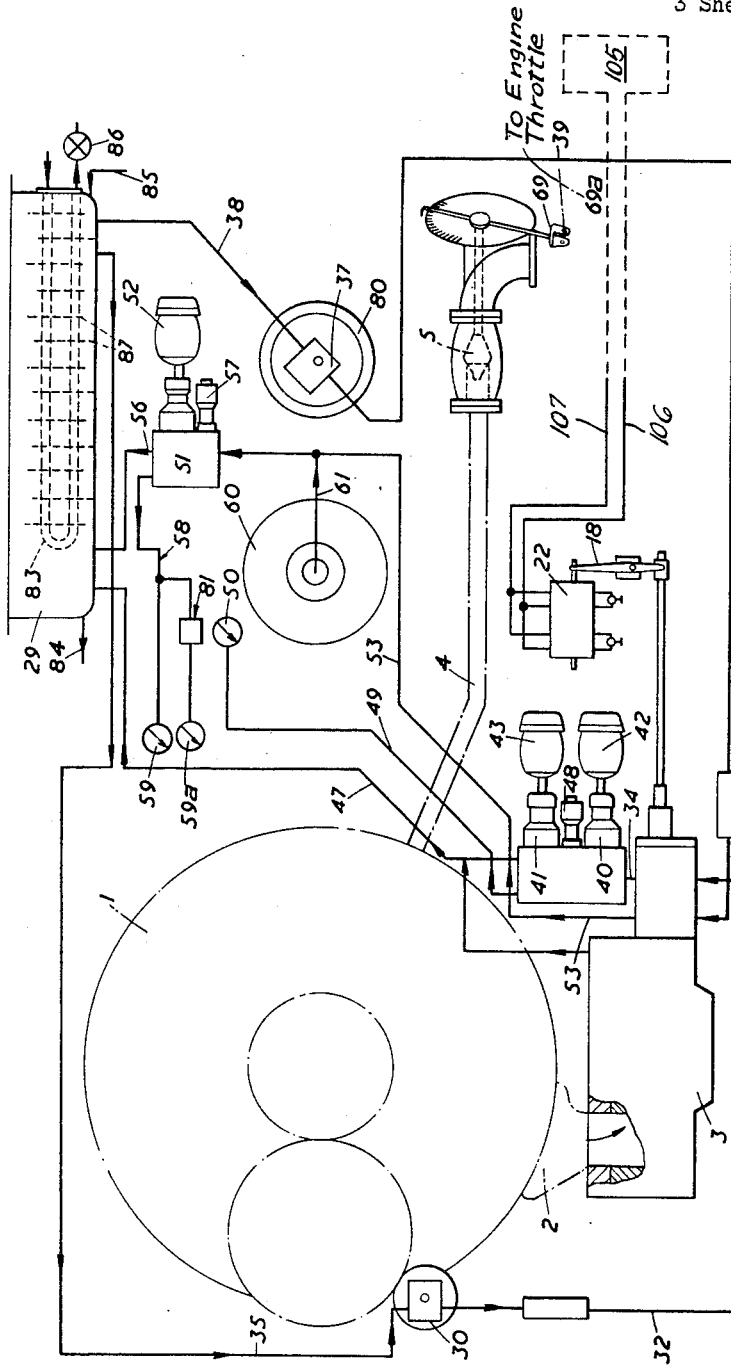

INVENTORS
G. A. Evans
I. M. Jarvis
BY
ATTORNEYS

United States Patent Office 3,138,954
Patented June 30, 1964

3,138,954
HYDRAULIC DYNAMOMETERS OR BRAKES
Godfrey Arthur Evans, Malvern, and Ivor Maurice Jarvis, Worcester, England, assignors to Heenan & Froude Limited, Worcester, England, a British company
Filed July 7, 1961, Ser. No. 122,444
4 Claims. (Cl. 73—134)

The present invention relates to absorption type hydraulic dynamometers or brakes.

It is an object of the invention to provide an absorption hydraulic dynamometer or brake having a constant speed characteristic, i.e. a very steeply rising natural torque-speed characteristic by which only a very small speed change occurs in response to a very large change of torque. For the purpose of describing the present invention a dynamometer in which a speed change of not more than 7½% occurs upon the variation of load of between full load and quarter full load is considered to have a constant speed characteristic.

According to the invention an absorption hydraulic dynamometer or brake is provided with a back pressure valve for imposing a variable back pressure at the outlet of the dynamometer, and means for operating the said valve to vary the back pressure, the said valve operating means being responsive to a force which varies proportionally to the speed of the dynamometer, and an opposing substantially constant reference force.

Conveniently the said valve operating means is actuated by a fluid pressure control circuit, the said variable force being supplied by pressure fluid delivered by a first pump which is coupled to the dynamometer so that the pressure developed by the pump varies as to speed of the dynamometer, and the reference force being supplied by pressure fluid delivered by a second pump driven at a constant speed to develop a substantially constant reference pressure. The variable pressure and the reference pressure act in opposition on a piston controlling the operation of the back pressure valve in such manner that the variable pressure is not effective to operate the valve to vary the back pressure on the dynamometer until the dynamometer speed reaches a value such that the pressure developed by the first pump exceeds that of the second pump. In this manner the speed of the dynamometer above which it operates on a constant speed characteristic is determined by the reference pressure and below this speed the dynamometer operates on minimum propeller law characteristic.

According to a further feature of the invention there is provided means for maintaining the control circuit pressure fluid at constant temperature, and means for evacuating air from the fluid, thereby to ensure that for any set condition of dynamometer load and speed no drift from the set point occurs.

According to a still further feature of the invention there is provided an hydraulic dashpot mechanically connected to the aforementioned back pressure valve control piston, and provided with variable damping to provide variable "feed back" to the control circuit so that the controlling force is proportional to the rate of change of torque thereby to prevent overgoverning and/or undergoverning action taking place.

According to a yet still further feature of the invention there is provided additional control means for the back pressure valve which is adapted for connection to the engine propeller control unit of an aircraft propeller turbine engine for operation solely thereby or in conjunction with the aforementioned back pressure valve control circuit so that when the engine shaft is coupled to the dynamometer shaft the back pressure valve is operated in a manner such that the load applied to the engine by the dynamometer simulates that resulting from an airscrew operated under flight condition.

According to yet another feature of the invention the said additional control means is operated by pressure fluid and there are provided adjustable valves interposed in the pressure fluid lines between the aforementioned additional control means and the engine propeller control units, to provide variable control of the rate of change of increase and/or decrease of the controlling fluid pressure.

According to yet still another feature of the invention the dynamometer is provided with a variably adjustable inlet valve adapted to be connected to the throttle actuating means of an engine coupled to the dynamometer so that as the throttle is opened the opening in the inlet valve is increased thereby to increase the inflow of water to the dynamometer. In this manner when the throttle is opened wide for "slam" acceleration the opening of the inlet valve is increased to increase the rate of inflow of water therethrough to ensure rapid filling of the dynameter and consequently a quick load build up when the back pressure valve is partially closed.

Figure 2:
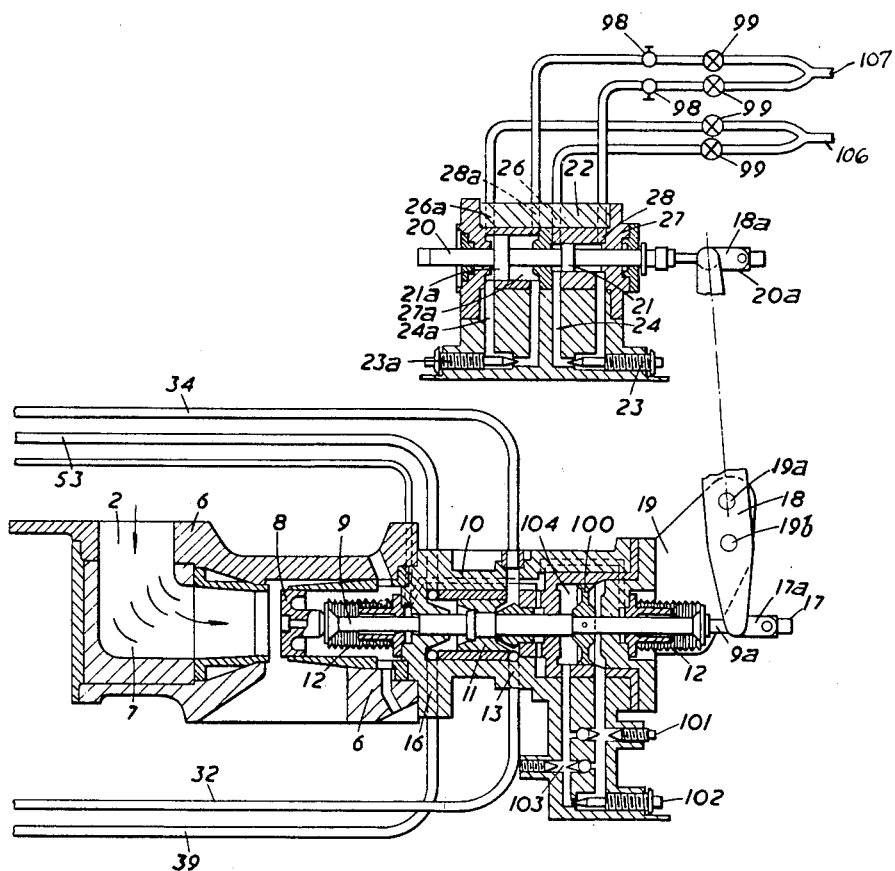
Figure 3A:
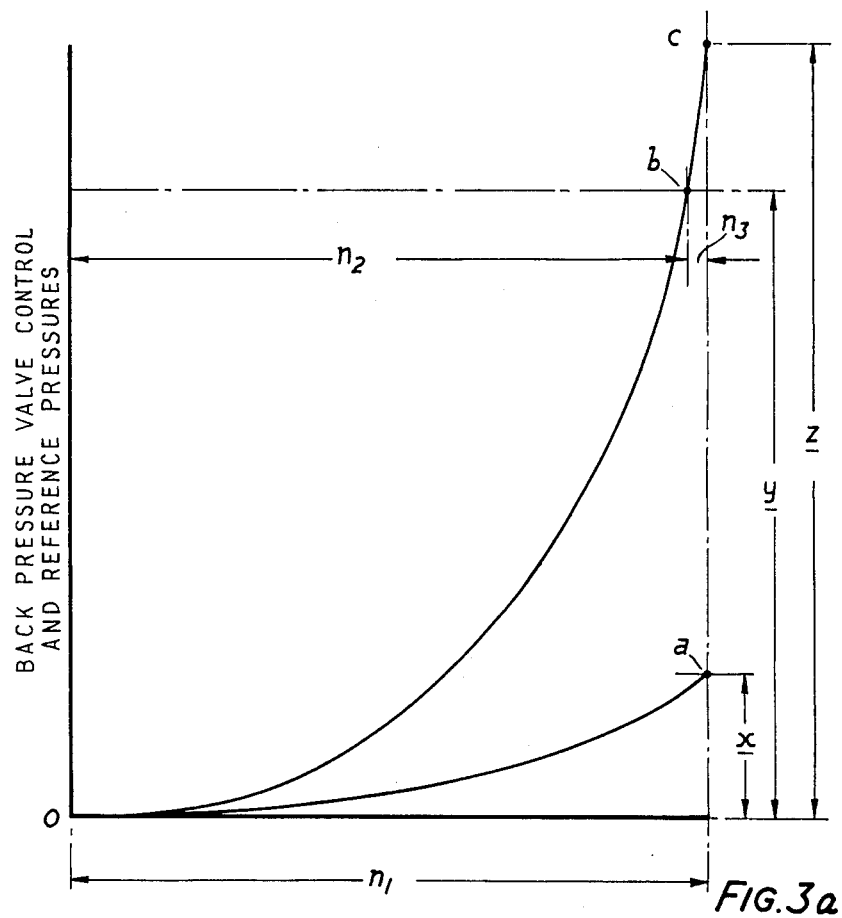
Figure 3B:
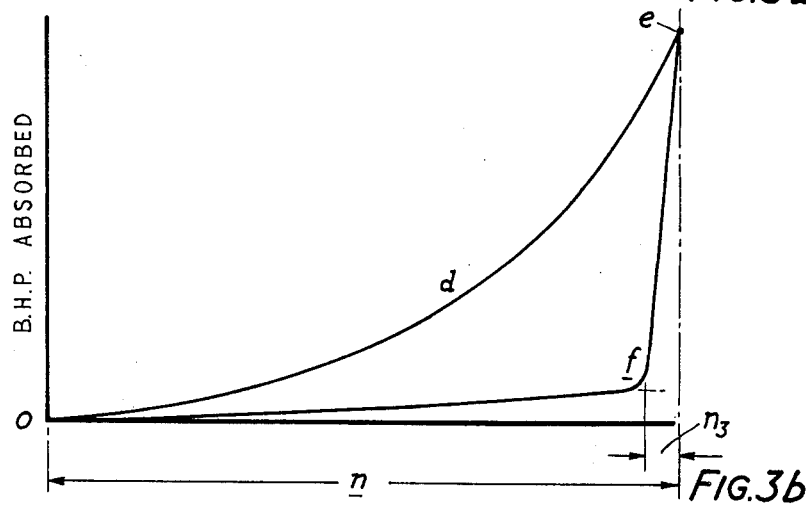

The invention will now be described with reference to the accompanying drawings. In the drawings:

FIGURE 1 illustrates diagrammatically a hydraulic absorption dynamometer embodying the invention, FIGURE 2 is a sectional elevation drawn to an enlarged scale of the back pressure valve of FIGURE 1 and the operating means therefor, and FIGURES 3a and 3b are curves illustrating the operation of the dynamometer.

Referring firstly to FIGURE 1 there is shown diagrammatically at 1 the casing of an absorption dynamometer having in the lower portion thereof an outlet 2 controlled by a back pressure valve indicated generally at 3. The casing is also provided with an inlet 4 controlled by an inlet valve indicated generally at 5. The back pressure valve 3 is adapted to impose variable back pressure on the water issuing from the outlet 2 and is actuated by two sources of pressure fluid one of which supplies fluid at a pressure which varies as the speed of the dynamometer and the other of which supplies fluid at a constant pressure which acts in opposition to the variable pressure and is hereinafter referred to as the reference pressure.

The back pressure valve therefore comprises a body 6 (FIGURE 2) connected to the outlet 2 and formed to provide a channel 7 of circular cross section through which the water discharged through outlet 2 is caused to flow. A mushroom valve member 8 is positioned adjacent to the outlet end of the channel 7 coaxially therewith and is carried on one end of a spindle 9 supported for sliding movement towards and away from the outlet end of the channel 7 so that the valve member 8 moves towards and away from the outlet of the channel 7 thereby to vary the outflow of water through the channel and exert variable back pressure on the water issuing from the dynamometer casing.

The spindle 9 is slidably supported in the end plates of a cylinder 10 and has secured thereto a control piston 11 sliding in the cylinder 10.

A second piston 100 secured to spindle 9 is housed in an auxiliary cylinder 104 to provide an hydraulic dashpot. The dashpot is filled with fluid at substantially atmospheric pressure and provides variable damping to the control action of the controlling piston 11. Said variable damping is obtained by suitable operation of adjustable needle valves 101, 102 and 103 disposed in ducts connecting the ends of the auxiliary cylinder 104.

The variable pressure acting on the piston 11 may be generated by one or more pumps coupled to the dynamometer shaft and in the embodiment shown in FIGURE 1 is generated by a pump 30 coupled to the dynamometer shaft for rotation thereby at a speed proportional to the speed of the dynamometer. (More than one pump 30 may be provided if required.) The inlet of the pump 30 is connected by pipe 35 to an oil reservoir 29 arranged either on, adjacent to, or remote from the dynamometer but at a height which will ensure a positive head of oil above the inlet to the pump 30. The outlet of the pump 30 is connected by pipe 32 to one end of the operating cylinder 10 of the back pressure valve 3 and pressure oil is therefore supplied through the pipe 32 at a pressure which varies proportionally with the speed of the dynamometer. The reference pressure is generated by a further pump 37 the inlet of which is connected by pipe 38 to the oil reservoir 29 and the outlet by pipe 39 to the other end of the operating cylinder 10 of the back pressure valve 3. The pump 37 is driven at constant speed as for example by an electric motor 80 and therefore delivers oil at constant pressure through the pipe 39 to the said other end of the operating cylinder 10. The pumps 30 and 37 may be of the positive displacement or other suitable type.

Pressure oil supplied through the inlet pipe 32 also flows through a pipe 34 to the inlet of a first needle valve 40, after having passed through the operating cylinder 10 of the back pressure valve. The oil then flows through the valve 40 and through a second needle valve 41 to return through pipe 47 to the oil reservoir 29. The needle valves 40 and 41 are connected in parallel so that one acts as a main control and the other as a vernier and are mounted together as a unitary assembly, a spring loaded relief valve 48 being interposed between the two needle valves for protection against excessive pressure. Constant pressure oil delivered through pipe 39 also flows through pipe 53, after having passed through the operating cylinder 10, to the inlet of a third needle valve 51 and from the outlet thereof through pipe 56 to the oil reservoir 29. A relief valve 57 is associated with the needle valve 51. Each of the needle valves 40, 41 and 51 comprises in known manner a needle-like valve member (not shown) slidable within a cylindrical sleeve to cover or uncover balanced and graduated orifices in the sleeve thereby to vary the flow of oil through the valve, and movement of the valve member is effected by an electric motor indicated at 42, 43 and 52 respectively thereby allowing the needle valves to be remotely controlled. The valves can of course be operated by any other known source of power such as hydraulic or pneumatic motors. Alternatively the needle valves could be arranged for hand operation.

The needle valves 40 and 41 serve to bleed off some of the variable pressure oil delivered through the pipe 34 and the needle valve 51 serves a similar purpose in respect of the constant pressure oil delivered through pipe 39 so that by means of the needle valves the effective pressure exerted by the variable pressure oil and the constant pressure oil respectively, on the piston 11 can be adjusted. A pipe 49 connected to the needle valve 41 leads to a pressure gauge 50 and a pipe 58 connected to the needle valve 51 leads to a high pressure gauge 59, the gauges 50 and 59, thus indicating respectively the pressure of the variable pressure oil and the reference pressure oil. Pipe 58 is also connected to a low pressure gauge 59a to facilitate setting low values of reference pressure. In addition a pressure switch 81 is connected to the pipe 58 and served to control the lighting of a new lamp (not shown) to give an alarm indication if for any reason the reference pressure should fail.

Referring now more especially to FIGURE 2 it will be seen that the variable pressure oil enters the cylinder 10 through port 13 at one end of the cylinder and the constant pressure oil enters the cylinder through inlet port 16 at the other end of the cylinder so that the piston 11 is acted upon on one face by the variable pressure oil and on the other face by the constant pressure oil. Leakage of oil along the spindle 9 is prevented by flexible bellows 12 secured to end plates of the cylinders 10 and 104, and to the spindle 9. The cylinder 104 of the hydraulic dashpot is filled with oil from the low pressure side of the pressure fluid system so that the impressed head on the dashpot is only that equal to the height of the oil reservoir 29. The other end of the spindle 9 is extended as at 9a through the corresponding flexible bellows 12 and is secured to a cross head 17 connected by a link 17a to one end of a lever 18 pivoted on support bracket 19. The other end of the lever 18 is connected to a cross head 20a by pivoted links 18a. The cross head 20a is secured to one end of the piston rod 20 of a pressure variable ram indicated generally at 22. The lever 18 is adapted to be pivoted on the support 19 by alternative pivotal connections 19a and 19b thereby to vary the mechanical advantage of the lever.

The spindle 20 of the pressure variable ram 22 has secured thereto a piston 21 sliding within a cylinder 27 provided at each end with inlet ports 26 and 28 respectively. Port 26 is connected to the coarse pitch oil outlet pipe 106 of an engine propeller control unit (illustrated diagrammatically by the block 105 (FIG. 1)) and the inlet port 28 is connected to the fine pitch outlet pipe 107 of the said control unit. A second piston 21a is also attached to spindle 20 and slides within a cylinder 27a which is also provided at each end with inlet ports, 26a and 28a, connected to the coarse pitch oil outlet pipe 106 and the fine pitch oil outlet pipe 107 respectively of the engine propellor unit. Isolating valves 99 are provided respectively in each of the oil lines which connect the inlet ports 26 and 26a to the coarse pitch oil outlet and in the oil lines which connect the inlet ports 28 and 28a to the fine pitch oil outlet of the engine propellor control unit. Thus either or both of the pistons 21 and 21a can be operated upon by fine and coarse pitch oil pressure by suitable opening and/or closing of these isolating valves. The two ends of the cylinder 27 are interconnected by a duct 24 in which is interposed an adjustable needle valve 23. The two ends of the cylinder 27a are interconnected in a similar manner by duct 24a in which is interposed an adjustable needle valve 23a. Variable orifice valves 98 are provided in each of the fine pitch lines feeding fine pitch oil pressure to cylinders 27 and 27a for adjusting the rate of change of fine pitch oil pressure with respect to engine speed. In operation, when the coarse pitch oil pressure exceeds the fine pitch oil pressure the pistons 21 and 21a will be moved to the right as viewed in FIGURE 2 and through the connection of the piston rod 20 to the lever 18 will move the back pressure valve spindle 9 to the left thereby to increase the back pressure exerted by the valve member 8 and increase the load of the dynamometer. Conversely if the fine pitch oil pressure exceeds the coarse pitch oil pressure the back pressure valve member will be moved to the right as viewed in FIGURE 2 to reduce the back pressure exerted on the dynamometer outlet. The pressure variable ram 22 thereby provides a controlling force which can over-ride or is in addition to the controlling force exerted on the back pressure valve by the oil delivered by the pumps 30 and 37 depending upon the adjustment of the needle valves 40, 41 and 51 respectively which control these pumps. For example, when these needle valves are fully open the pumps 30 and 37 exert no controlling force on the back pressure valve and the pressure variable ram 22 is then the sole and over-riding control. If the needle valves are partially closed then the pumps 30 and 37 provide assistance to the control action of the pressure variable ram 22.

A pressure smoothing device 60 shown in FIGURE 1 is connected by pipe 61 to the constant pressure oil line 53 and conveniently may comprise an oil filled accumulator or vessel containing a flexible bag charged with nitrogen or other gas at a fixed predetermined pressure.

The water inlet control valve 5 shown in FIGURE 1 is of the rotary type and the operating lever 69 for effecting rotation of the valve is connected by a suitable linkage partly shown at 69a to an engine throttle control lever (not shown) and to the throttle lever itself of an engine under test. The said linkage is arranged so that when the engine throttle is in the closed position the inlet valve 5 is moved towards its closed position so that the flow of water into the dynamometer is minimum and when the engine throttle is opened so that the engine develops more power the inlet valve opens to correspondingly increase the flow of water into the dynamometer.

The oil reservoir 29 is provided with cooling coils 83 and the oil is continuously circulated and filtered through pipes 84 and 85 connected to a pump and filter (not shown). The flow of cooling water through the cooling coils 83 is controlled by a known form of thermostatically controlled valve 86 receiving its controlling signal from a temperature sensitive element (not shown) conveniently situated in the oil reservoir. This automatic control of cooling water in conjunction with a known form of oil heating equipment and in conjunction with a baffle system 87 arranged to provide adequate mixing of the oil, ensures that the control oil entering the control circuits from the oil reservoir is maintained at substantially constant temperature.

In operation of the back pressure valve, the pressure oil supplied by the pump or pumps 30 to one face of the piston 11 tends to move the valve spindle 9 towards the closed position thereby to exert back pressure on the water flowing from the dynamometer through the outlet duct 7. As the speed of the dynamometer increases the volume of oil circulated by the pump or pumps 30 increases in direct proportion to the speed increase and the resistance across the needle valves 40 and 41, will, for any one fixed adjustment of these valves, rise as the square of the speed increase. The back pressure exerted by the back pressure valve will therefore rise approximately as the square of the dynamometer speed and the dynamometer will operate on a propellor law characteristic. The oil delivered by the constant speed pump 37 is applied to the other face of the piston 11 and tends to maintain the back pressure valve in the open position. The pressure delivered by the constant speed pump 37 can be adjusted to a desired value by means of the needle valve 51 and it follows that until the speed of the dynamometer reaches the value at which the pressure delivered by the variable speed pump 30 exceeds that of the pump 37 the back pressure valve will be maintained in an open position. With further increase in dynamometer speed, the variable pressure will exceed the constant reference pressure and the valve spindle 9 will be moved in the valve closing direction to exert back pressure on the dynamometer.

Thus and referring to FIGURE 3a showing the relation between the back pressure valve control and reference pressure and the speed of the dynamometer, the curve $oa$ represents the rise in control pressure when the dynamometer operates solely according to a propellor law characteristic and the pressure $x$ is that which is needed to apply the necessary back pressure at a speed of $n1$. If however, the reference pressure $y$ is applied to the back pressure valve then in order to obtain the same back pressure at speed $n1$ the control or variable pressure must rise according to the curve $obc$ and the net effective pressure applying the dynamometer load is $z-y=x$. It will further be apparent that the back pressure valve will be fully open until the speed $n2$ is reached i.e. at point $b$ and that the major portion of dynamometer load will then be applied during the small speed increase $n3$.

If the reference pressure $y$ and the control pressure $z$ are both increased by the same amount so that their difference is still equal to $x$ the section $bc$ of the curve $obc$ will increase in steepness and the speed increase $n3$ will be correspondingly smaller. The opposite will occur if the reference and control pressures are reduced to zero when the point $c$ will coincide with point $a$ and the point $b$ with point $o$ i.e. the curve $obc$ coincides with the curve $oa$.

In FIG. 3b there is shown the B.H.P. absorption characteristic and the line $ode$ refers to normal propellor law operation corresponding to operation of the back pressure valve according to the curve $oa$ of FIG. 3a. For a net pressure $bc$ of FIG. 3a, the B.H.P. absorption will follow the curve $ofe$ of FIG. 3b, the rapid rise in horse power occurring at point $f$ corresponding to the point $b$ on the curve $obc$ of FIG. 3a.

Thus it will be seen that the dynamometer control can be made to have a high gain characteristic i.e. a large controlling force is generated as the result of a very small speed change. It is therefore necessary to introduce a feed back or negative controlling force which is proportional to the rate of change of B.H.P. absorption of the dynamometer to ensure that no over correction or under correction takes place. This is achieved by suitable adjustments of the needle valves 101, 102 and 103 connected to the cylinder 104 of the dashpot piston 100 to vary the degree of hydraulic damping applied to movement of the back pressure valve spindle 9.

The engine propeller control unit fitted as an integral part of the engine is usually a governor or speed sensing device provided with a lever which can be set by hand to various positions to predetermine the operating speed of the engine. In flight, the propeller blades are moved by the action of this unit to coarser or finer pitch and absorbing more or less load so as to maintain the desired operating speed for the permitted consumption of fuel at that speed. On the test bench the hydraulic dynamometer must for these conditions of interconnection test take the place of the propeller and when suitably connected to the engine propeller control unit must load the engine in a similar manner to that obtaining in flight.

For the purpose of these tests the back pressure system of control derived from pumps 30 and 37 is usually suppressed or rendered ineffective by fully opening needle valves 40, 41 and 51 thus reducing the control pressures to zero. All forces applied to open or close the back pressure valve 3 are then derived solely from the ram 22 acting through the lever 18. Under certain circumstances, however, the controlling pressure required from the engine propeller control unit to provide the necessary controlling forces at the back pressure valve may be outside the normal working range of the engine control unit. Under these circumstances assistance is provided by the normal back pressure system of control by partially closing the needle valves 40, 41 and 51 so as to bring the controlling pressures demanded from the engine propeller control unit to within the normal maximum operating values.

The engine propeller control unit which is essentially a speed governor, will for any one fixed setting of its control lever add load if the speed rises and reduce load if it falls i.e. for a speed increase there will be a rise in coarse pitch pressure as compared with fine, while for falling speed there will be a rise in fine pitch pressure as compared in coarse pitch pressure. Coarse pitch excess pressure acting upon piston 21 and/or 21a will tend to move the valve member 8 towards the closed position and excess fine pitch pressure acting on the piston 21 and/or 21a will function in reverse to remove dynamometer load. The speed will thus be stabilised at the desired setting irrespective of the actual load being developed, and any tendency to depart from this speed will be corrected by the addition or subtraction of dynamometer load until the preset speed is restored.

When the engine propeller control unit lever is advanced from a set position to a higher speed setting, the characteristics will remain as described. Thus, because the actual running speed will be momentarily below the new set speed, dynamometer load will be taken off by an excess of fine pitch over coarse pitch pressure. The speed will then rise until upon the new set speed being slightly exceeded, coarse pitch pressure will exceed fine so that the final running speed will stabilise at the new value.

The engine propeller control unit is often mechanically linked within the engine itself to the fuel supply so that a particular running speed corresponds automatically to a given rate of fuel supply and hence power developed at that speed. This is known as interconnection.

Slam accelerations usually have to be conducted under conditions of interconnection, the procedure being that of suddenly opening the throttle wide from a relatively low load setting and measuring the time interval for the engine to attain maximum speed. As the throttle is interconnected with the engine propeller control unit this action will immediately preselect a high speed of rotation. Load will be taken off the dynamometer and the speed will rise very rapidly until on some excess of speed above that preset, the coarse pitch oil will be effective to apply dynamometer load and contain the speed at the new value.

In order to provide, under these conditions, very quick filling of the dynamometer casing with water which will assist the rapid application of the increased load necessary at the extreme latter end of the acceleration period, the water inlet valve 5 is mechanically coupled to the engine throttle lever. Immediately the throttle is opened wide for slam acceleration, the rate of water inflow to the dynamometer carcass is automatically increased and there is in effect instant preparation for rapid fill and for quick load build up when the back pressure valve is partially closed. The degree of opening and closing of the inlet valve in relation to throttle movement is adjustable in any desired degree.

The coupling of the dynamometer inlet valve to the throttle has other incidental advantages, one being that under starting conditions the water flow rate through the dynamometer and hence rotational resistance tends to be lower than with a fixed quantity of water suitable for maximum B.H.P. absorption. This reduces the load on the engine starting mechanism.

It will be understood that the invention is not limited to the above described specific embodiment thereof and that means other than pressure fluid operated means, for example mechanical or electrical means, may be employed for controlling the actuation of the back pressure valve.

We claim:

1. In combination with an hydraulic dynamometer having an inlet for supplying water thereto and an outlet for discharging water therefrom, a back pressure valve connected to said outlet for variably adjusting the flow of water therethrough thereby to impose back pressure on the water within the dynamometer, fluid pressure operable means operatively connected to the back pressure valve for actuating the back pressure valve to vary the said outlet flow of water, an operating fluid reservoir, a first pump means responsive to the speed of the dynamometer for developing a variable pressure in said operating fluid proportional to the speed of the dynamometer, a second pump means driven at a constant speed for developing a constant reference pressure in said operating fluid, the said back pressure valve actuating means comprising a cylinder, a piston slidable in said cylinder, a piston rod mounting said piston and operatively connected to the back pressure valve for effecting said actuation thereof, means for supplying said constant reference pressure fluid to one end of the cylinder to urge the piston in a direction to actuate the back pressure valve towards fully open position, and means for supplying the said variable pressure fluid to the other end of said cylinder to urge the piston in a direction to actuate the back pressure valve towards the closed position, whereby upon the speed of the dynamometer reaching a predetermined speed, the force exerted on the piston by said variable pressure fluid overcomes the force exerted on the piston by the reference pressure fluid and the back pressure valve is moved towards the closed position to build up back pressure rapidly in response to any further increase in the speed of the dynamometer, thereby so increasing the ratio between the power absorbed by the dynamometer and its speed of rotation as to maintain the speed of the dynamometer substantially constant at the said predetermined speed.

2. The combination claimed in claim 1 further comprising valve means adjustably controlling the flow of the variable pressure fluid and the reference pressure fluid respectively to thereby vary the rate at which the ratio between the power absorbed by the dynamometer and its speed of rotation increases.

3. The combination claimed in claim 1 and further including an hydraulic dashpot device mechanically coupled to said piston for damping movement thereof, and means for varying the damping action of said dashpot device.

4. The combination claimed in claim 1 and further including a variable pressure ram mechanically coupled to said back pressure valve for effecting actuation thereof, a piston on said ram, a cylinder within which said piston is slidable, means for connecting one end of the cylinder to the coarse pitch outlet of an engine propeller control unit of an aircraft engine coupled to the dynamometer, and means for connecting the other end of the cylinder to the fine pitch outlet of the said control unit, whereby the said ram is actuated in one direction or the other by the pressure differential between the coarse and fine pitch outlets of the control unit, thereby to actuate the back pressure valve towards the open position or towards the closed position to impose variable back pressure on the water within the dynamometer such that the load applied by the dynamometer simulates that resulting from an airscrew driven by said aircraft engine under flight conditions.

References Cited in the file of this patent

FOREIGN PATENTS

| | | |
|---|---|---|
| 46,155 | Netherlands | July 15, 1939 |
| 1,195,814 | France | May 19, 1959 |